United States Patent
Tosaka et al.

(10) Patent No.: US 6,502,235 B1
(45) Date of Patent: Dec. 31, 2002

(54) APPARATUS, METHOD, AND STORAGE MEDIUM FOR GENERATING INPUT PARAMETER

(75) Inventors: Hideki Tosaka, Kanagawa (JP); Yoriko Yoshitomi, Kanagawa (JP); Hirotoshi Yamada, Kanagawa (JP); Ikunori Moriya, Kanagawa (JP); Shingo Kamuro, Kanagawa (JP); Tetsuro Imamura, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/480,114

(22) Filed: Jan. 10, 2000

(30) Foreign Application Priority Data

Jun. 2, 1999 (JP) .......................................... 11-154715

(51) Int. Cl.[7] .............................................. G06F 11/28
(52) U.S. Cl. ...................................... 717/126; 717/124
(58) Field of Search ................................ 717/126, 124

(56) References Cited

U.S. PATENT DOCUMENTS

| | | | | |
|---|---|---|---|---|
| 5,438,574 A | * | 8/1995 | Taniguchi | 714/38 |
| 5,495,612 A | * | 2/1996 | Hirayama et al. | 709/331 |
| 6,002,869 A | * | 12/1999 | Hinckley | 714/35 |
| 6,071,316 A | * | 6/2000 | Goossen et al. | 717/126 |
| 6,163,858 A | * | 12/2000 | Bodamer | 714/34 |
| 6,185,733 B1 | * | 2/2001 | Breslau et al. | 709/331 |
| 6,330,692 B1 | * | 12/2001 | Kamuro et al. | 712/236 |

FOREIGN PATENT DOCUMENTS

| | | | | |
|---|---|---|---|---|
| JP | 63-305435 | 12/1988 | ........... | G06F/11/28 |
| JP | 8-095826 | 4/1996 | ........... | G06F/11/28 |
| JP | 9-244921 | 9/1997 | ........... | G06F/11/28 |

OTHER PUBLICATIONS

Fummi et al., Functional Design for Testability of Control–Dominated Architectures, 1997, ACM, p. 98–122.*
Jagadeesan et al., Specification based Testing of Reactive Software: Tools and Experiments, 1997, ACM, p. 525–535.*

* cited by examiner

Primary Examiner—Gregory Morse
Assistant Examiner—John Q. Chavis
(74) Attorney, Agent, or Firm—Staas & Halsey LLP

(57) ABSTRACT

The database generation unit refers to the source program, lists routes passed during the execution of the source program, and enters the route information in the route information database. As a result of executing the load module, the relevant information such as a value of a parameter used when a route is passed, and an execution state are entered in the route information database. The similar route determination unit extracts from the route information database a route path not passed, determines a similar route from passed routes, and transmits the relevant information in the input parameter generation unit. Based on the information about similar routes, the input parameter generation unit generates and outputs an input parameter required to pass a non-passed route path and a condition to be satisfied by an input parameter.

27 Claims, 17 Drawing Sheets

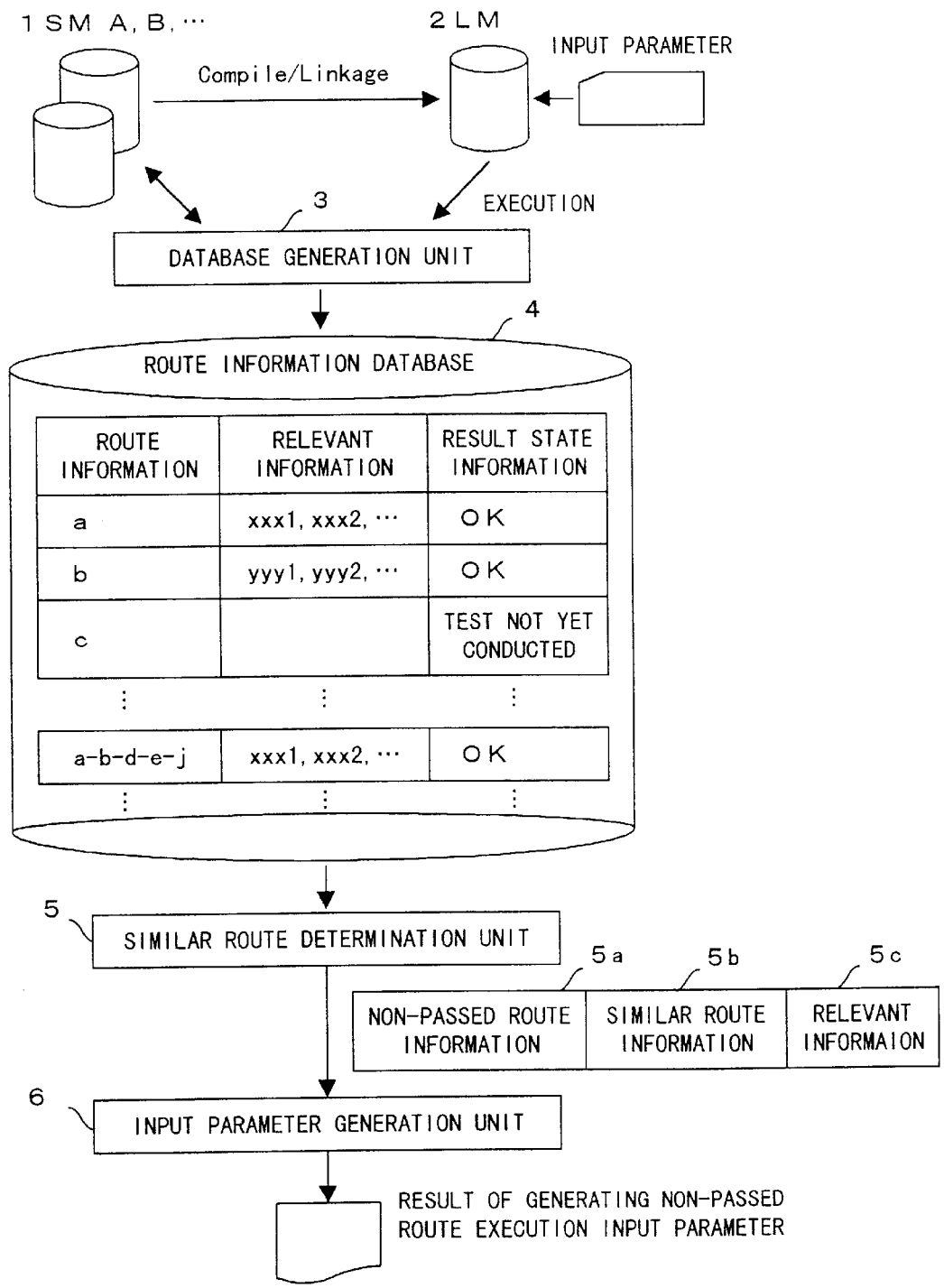
F I G. 1

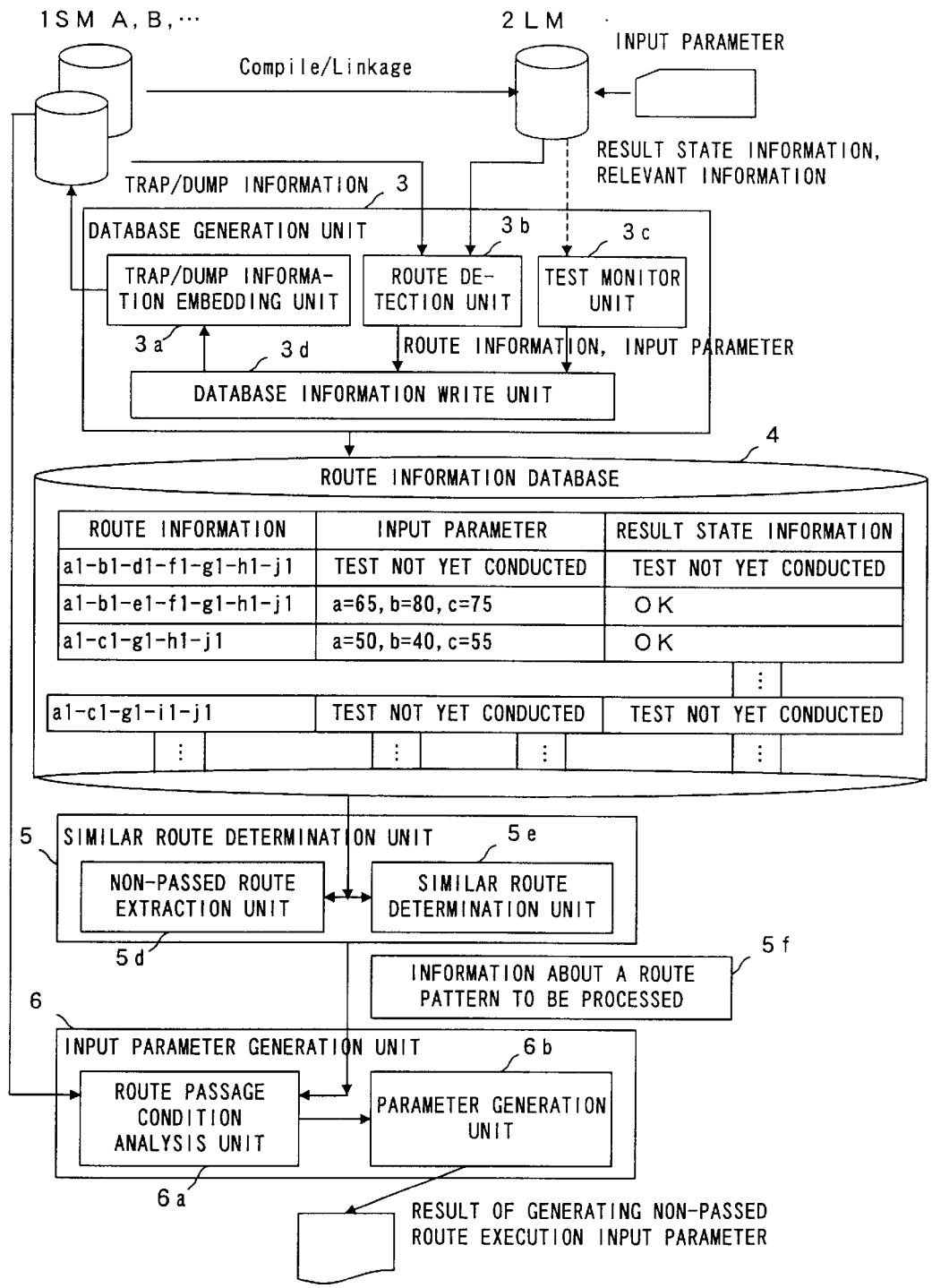
F I G. 4

```
void func1(int a, int b, int c){
    int average=0:                                          ⌐
    if(a>=60){                                              ⌐ a 1
        printf("You passed first examination ¥n"):          ⌐ b 1
        if (a+b>=140){                                      ⌐
            printf("You passed all examinations ¥n");       ⌐ d 1
        }else{                                              ⌐
            printf("You failed second examinations ¥n"):    ⌐ e 1
        }                                                   ⌐
        func2(a,b);                                         ⌐ f 1
    }else{                                                  ⌐
        printf("You failed first examination ¥n");          ⌐ c 1
    }                                                       ⌐ g 1
    average=(a+b)/2;                                        
    if(average<c){                                          ⌐ h 1
        printf("Your score is lower than before ¥n");       ⌐
    }else{                                                  ⌐ i 1
        printf("Your score is higher than before ¥n");      ⌐
    }                                                       ⌐ j 1
    return;
}
```

```
void func2(int a, int b){
    printf("%d,%d ¥n",a,b);                                 ⌐ a 2
    return;
}
```

FIG. 5A

──── : PASSED ROUTE PATH          ──── : ROUTE PATH NOT PASSED

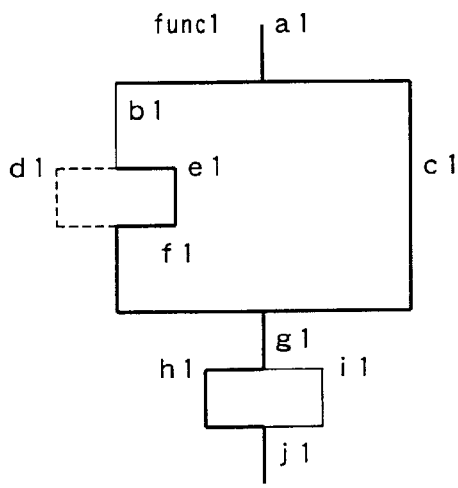

FIG. 5B

| Func1: | a1 | b1 | c1 | d1 | e1 | f1 | g1 | h1 | i1 | j1 |
|---|---|---|---|---|---|---|---|---|---|---|
| (x) | 1 |  |  |  | 1 | 1 | 1 | 1 |  |  |
| (y) | 1 | 1 | 1 | non-passed | 1 | 1 | 1 | 1 | 1 | 1 |
| or | 1 | 1 | 1 |  | 1 | 1 | 1 | 1 | non-passed | 1 |

| Func2: | a2 |
|---|---|
| | 1 |

F I G. 7

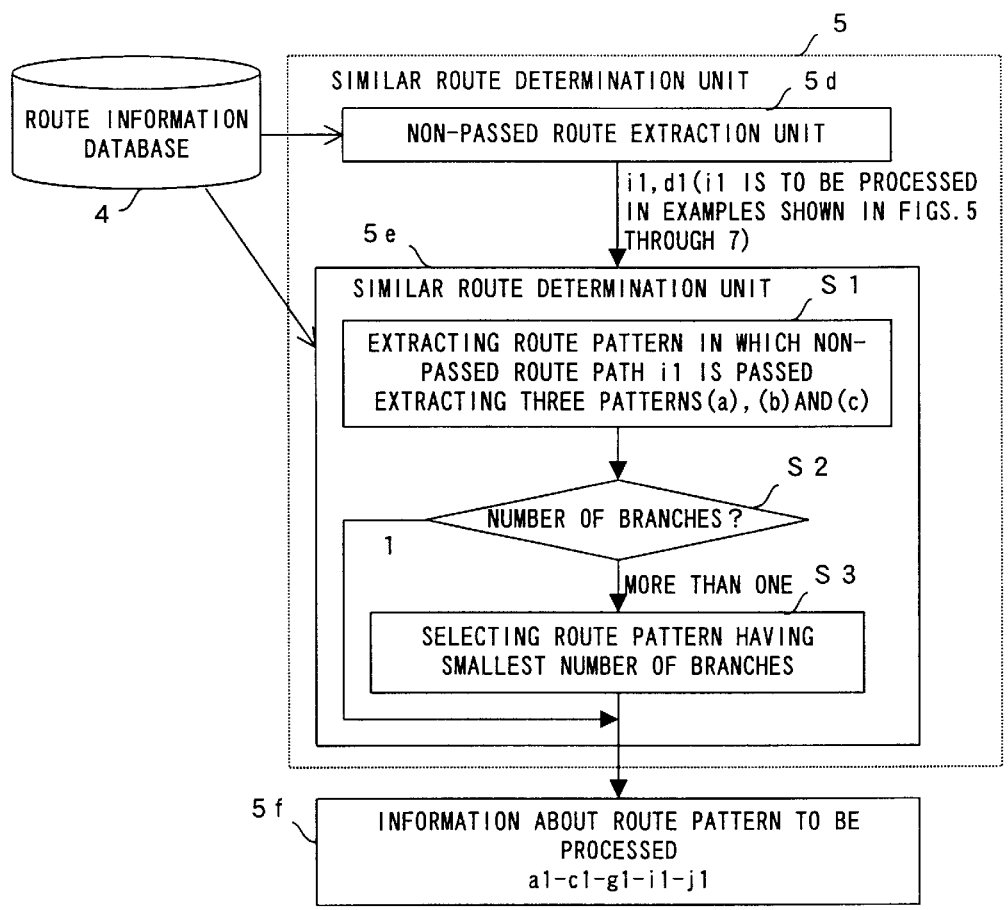
F I G. 9

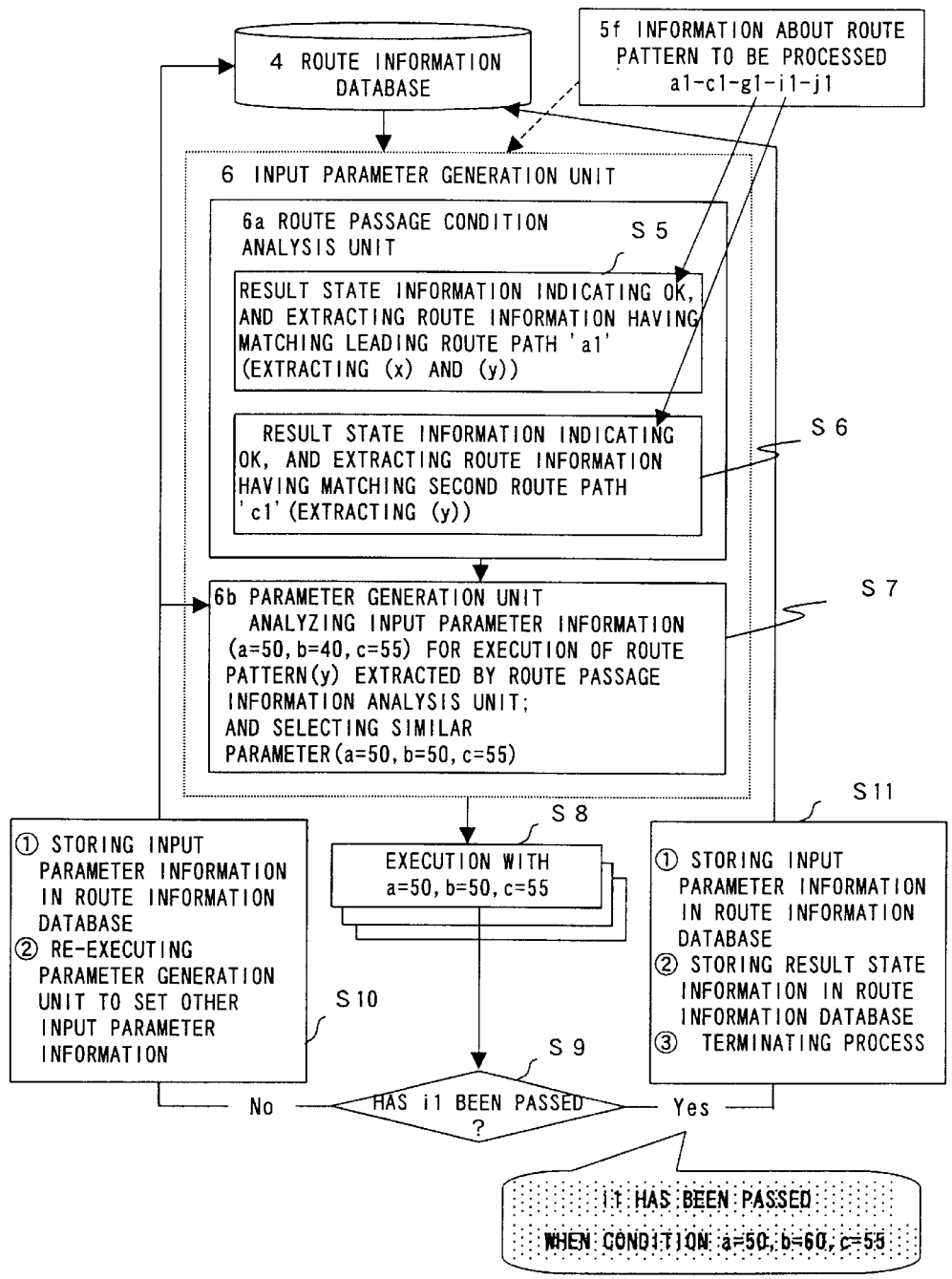
F I G. 10

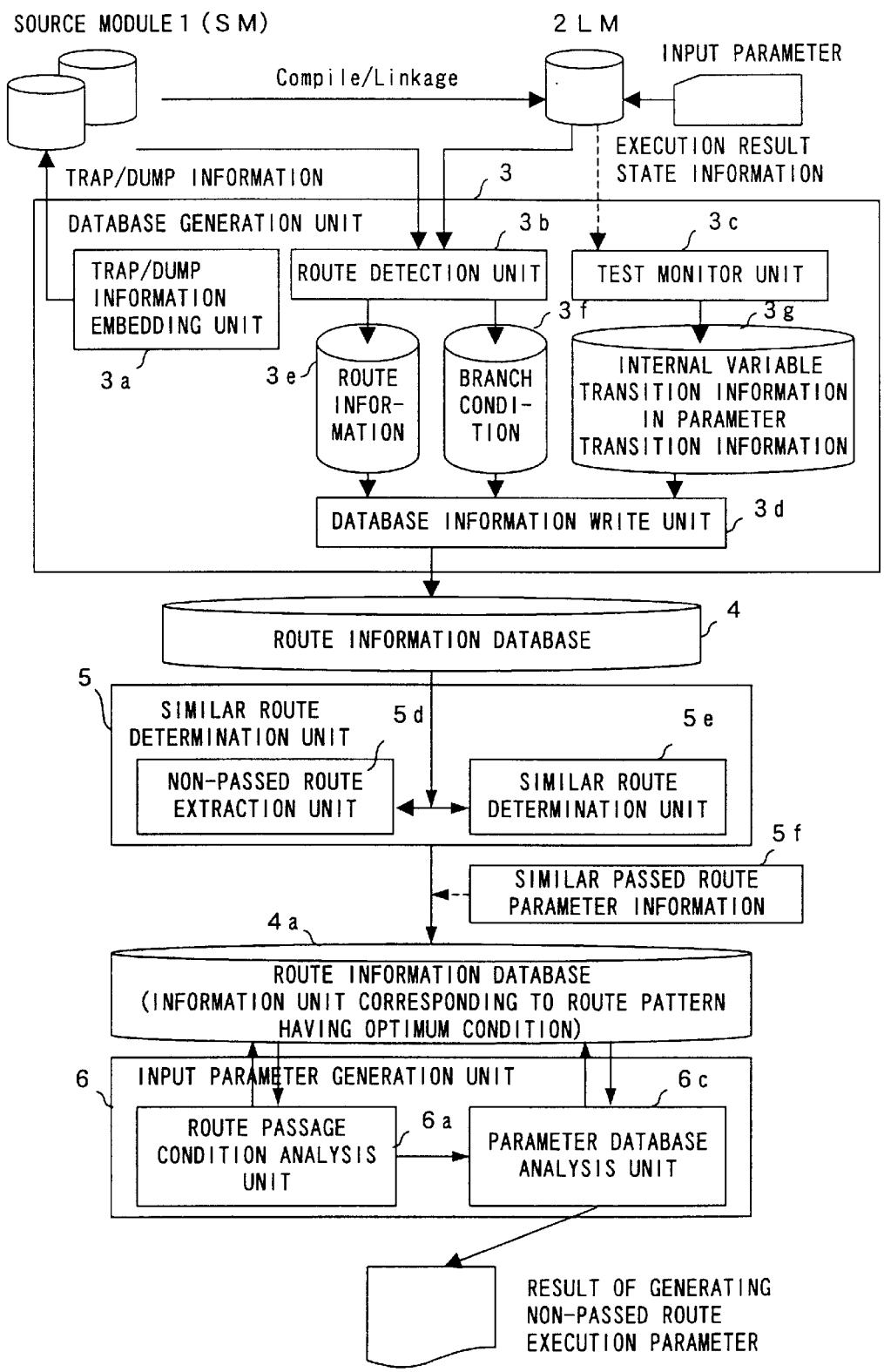
F I G. 1 1

⟨func a1-b1-e1-f1-g1-h1-j1 EXECUTION RESULT INFORMATION ABOUT ROUTE PATTERN⟩

| ROUTE PATH | TRANSITION (x) OF PARAMETER 1 | TRANSITION (tbl) OF PARAMETER 2 | TRANSITION (str) OF PARAMETER 3 | TRANSITION (a) OF INTERNAL VARIABLE | LINKED ROUTE OF CALL FUNCTION | NEXT ROUTE PATH BRANCH CONDITION | RETURN VALUE |
|---|---|---|---|---|---|---|---|
| a1 | INITIAL VALUE: x=5 x=x+tbl->t1 | INITIAL VALUE: tbl->t1=2 INITIAL VALUE: tbl->t2=1 | INITIAL VALUE: str="abc" | INITIAL VALUE:a=0 | NONE | tbl->t2==1:b1 | NONE |
| b1 | NONE | NONE | NONE | NONE | NONE | x>10:d1 | NONE |
| e1 | NONE | NONE | NONE | NONE | NONE | NONE | NONE |
| f1 | NONE | tbl->t2=0 | NONE | NONE | NONE | NONE | NONE |
| g1 | NONE | NONE | NONE | a=x+func2(tbl) | func2: a2-b2-d2 | a<100:h1 | NONE |
| h1 | NONE | NONE | NONE | a=a-2 | NONE | NONE | NONE |
| j1 | NONE | NONE | NONE | NONE | NONE | NONE | return a=7 |

⟨func2 a2-b2-d2 EXECUTION RESULT INFORMATION ABOUT ROUTE PATTERN⟩

| ROUTE PATH | TRANSITION OF PARAMETER 1 | TRANSITION OF INTERNAL VARIABLE | LINKED ROUTE OF CALL FUNCTION | NEXT ROUTE PATH BRANCH CONDITION | RETURN VALUE |
|---|---|---|---|---|---|
| a2 | INITIAL VALUE: tbl->t1=2 | INITIAL VALUE: b=0 | NONE | tbl->t1==2:b2 | NONE |
| b2 | NONE | b=b+tbl->t1 | NONE | NONE | NONE |
| d2 | NONE | NONE | NONE | NONE | return b=2 |

F I G. 1 3

APPARATUS, METHOD, AND STORAGE MEDIUM FOR GENERATING INPUT PARAMETER

BACKGROUND OF THE INVENTION

1. Field of the Invention

The present invention relates to a software execution test, and more specifically to an apparatus, a method, and a storage medium for generating an input parameter corresponding to an unexecuted route of a program.

2. Description of the Related Art

Recently, with an increasing amount of software developments, there arises a strong demand for an effective method for extracting an unexecuted test route to be used to process a test item in a software development process. In addition, there also arises a demand for an effective method for extracting a condition required to execute optional software. Therefore, it is necessary to store in a database an input parameter condition for determining an execution route in block units at the execution of software, and set the condition as a determination factor for use in determining the next execution route.

In the conventional system for extracting an input parameter condition, the condition of passing an unexecuted route is determined by a user analyzing only the branch condition immediately before an unexecuted portion in a source program. Therefore, a satisfactory passage condition of an unexecuted route cannot be figured out in an environment where the branch condition is affected at other portions.

In the conventional technology, a user determines an input parameter based on the value of each type of parameter obtained during the execution of software to pass an unexecuted route. Therefore, when the scale of a program is large, it is difficult to trace a change of a parameter in the execution order of the program. As a result, it is hard for a user to guess an input parameter for passage through an unexecuted route. On the other hand, since a program development period can be shortened by detecting, with a larger program scale, an unexecuted route and efficiently checking whether or not the program is normally operating, these processes are essential factors to reduce a development cost.

Accordingly, there is a strong demand in a software development testing process for a tool capable of automatically detecting an unexecuted route portion in a program, automatically generating an input parameter for passage through the unexecuted portion, and efficiently testing a program.

SUMMARY OF THE INVENTION

The present invention aims at providing an apparatus or a method for automatically detecting an unexecuted route, and automatically generating an input condition for passage through the unexecuted route during the execution of a program.

The input parameter generation apparatus according to the present invention is an apparatus for generating input parameters when a source module comprising a plurality of functions is converted into a load module for execution. The apparatus includes: an extraction unit for extracting a route pattern which is a set of route paths passed by a process for each of the plurality of functions of the source module, relevant information about the progress of each process of the route pattern passed when the load module is executed using a specific input parameter, and result status information indicating whether or not each route pattern has been passed during the execution of the load module; a similar route determination unit for extracting from the information extracted by the extraction unit a route path not passed when the load module is executed, and extracting a route pattern similar to the route pattern containing the non-passed route path in the route pattern passed when the load module is executed, and the relevant information of the similar route pattern; and an input parameter generation unit for analyzing the source module from the similar route pattern and the relevant information of the similar route pattern, and generating a value of an input parameter for passage through a non-passed route path.

The input parameter generating method according to the present invention is a method for generating input parameters when a source module comprising a plurality of functions is converted into a load module for execution. The method includes: (a) a step of extracting a route pattern which is a set of route paths passed by a process for each of the plurality of functions of the source module, relevant information about the progress of each process of the route pattern passed when the load module is executed using a specific input parameter, and result status information indicating whether or not each route pattern has been passed during the execution of the load module; (b) a step of extracting from the information extracted in step (a) a route path not passed when the load module is executed, and extracting a route pattern similar to the route pattern containing the non-passed route path in the route pattern passed when the load module is executed, and the relevant information of the similar route pattern; and (c) a step of analyzing the source module from the similar route pattern and the relevant information of the similar route pattern, and generating a value of an input parameter for passage through a non-passed route path.

According to the present invention, the conventional process of manually analyzing a source module using a parameter obtained as a result of the execution of a load module through a debugger function can be automatically performed. Especially, the extraction unit automatically checks the source module, extracts all routes to be probably passed in a process, and also obtains parameter values, etc. used when the load module is executed. With the above described configuration entered in a database unit, the extraction unit functions as a database generation unit. Then, the similar route determination unit extracts a non-passed route path according to the information obtained by the extraction unit when the load module is executed using a specific input parameter, and determines as a similar route pattern a passed route pattern similar to the route pattern containing the route path. The input parameter generation unit generates an input parameter for passage through a non-passed route path in a process, or generates a condition to be satisfied by the input parameter.

Therefore, it is not necessary to manually analyze a source module, and the development time and the development cost can be considerably reduced when a large program is developed.

BRIEF DESCRIPTION OF THE DRAWINGS

FIG. 1 shows the first principle of the present invention;

FIG. 4 shows the first embodiment of the present invention;

FIG. 5 shows a practical example of a source code used in the description of the present embodiment;

FIG. 7 shows an example of extracting a non-passed route path based on a practical example of the route information database shown in FIG. 6;

FIG. 9 shows the operation of a similar route determination unit 5;

FIG. 10 shows the operation of an input parameter generation unit 6;

FIG. 11 shows the second embodiment of the present invention;

FIG. 13 shows a practical example of a route information database 4a;

DESCRIPTION OF THE PREFERRED EMBODIMENTS

Figure 2:
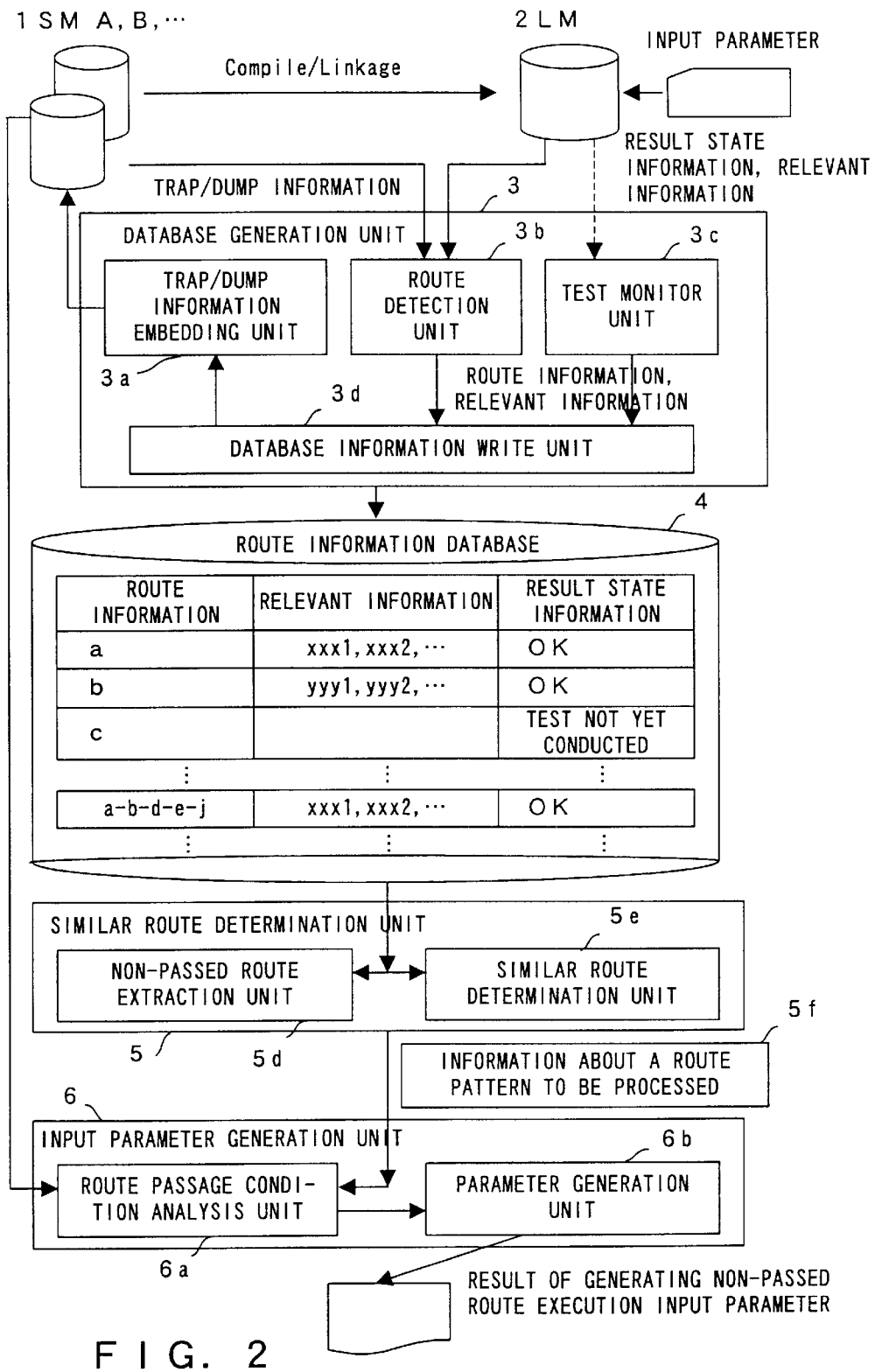
FIG. 2 shows the second principle of the present invention.

FIG. 1 shows the first principle of the input parameter generation apparatus according to the present invention.

A plurality of source modules (SM) 1 are converted into one load module (LM) 2 by compiling and linking processes.

A database generation unit 3 retrieves a route path for each of the minimum functions of the source module 1 and its route pattern as a set of route paths enters in a route information database 4 a module name, route information (route path name, route pattern name, etc.), and relevant information (statement number, etc.), extracts result state information (execution result of each route, etc.), and relevant information (input parameter, branch condition value, etc.), and enters them in the route information database 4.

A similar route determination unit 5 extracts an executed route closest to a non-passed route from the route information database 4, and extracts non-passed route information 5a, similar route information 5b, and relevant information 5c from the state of a passage test.

An input parameter generation unit 6 generates an input parameter of a non-passed route according to the information extracted by the similar route determination unit 5 and the analysis information of the source module 1.

FIG. 2 shows the second principle of the input parameter generation apparatus according to the present invention.

In FIG. 2, a component also shown in FIG. 1 is assigned the same reference code.

In the input parameter generation apparatus shown in FIG. 2, a route detection unit 3b of the database generation unit 3 extracts all route paths from the source module 1, and enters them in the route information database 4 with the relevant information. A trap/dump information embedding unit 3a embeds trap/dump information in each route and branch condition to dynamically obtain the extracted route information and the relevant information.

A test monitor unit 3c monitors a dynamic execution state at the passage test of the load module 2 generated from the source module 1 into which the trap/dump information is embedded by the trap/dump information embedding unit 3a, collects and enters the route passage result state information and the relevant information at an execution time, and generates the route information database 4.

The similar route determination unit 5 comprises a relevant information 5d and a similar route determination unit 5e. The non-passed route 5 extraction unit 5d extracts a non-passed route path from the route information database 4. The similar route determination unit 5e extracts from the non-passed route extracted by the non-passed route extraction unit 5d the similar route path, the similar route pattern, and the relevant information using a passed route path passed immediately before the branch condition of a non-passed portion as a similar route path. The extracted similar route path, similar route pattern, and relevant information are output from the similar route determination unit 5 as information 5f about a route pattern to be processed which is the information to be used in generating an input parameter.

The input parameter generation unit 6 comprises a route passage condition analysis unit 6a having the function of analyzing the information extracted by the similar route determination unit 5, and the process of setting a branch condition of a source program and a variable, and a parameter generation unit 6b for generating an input parameter from the analysis result of the route passage condition analysis unit 6a. The input parameter generation unit 6 generates an input parameter for passage through a non-passed route.

Figure 3:
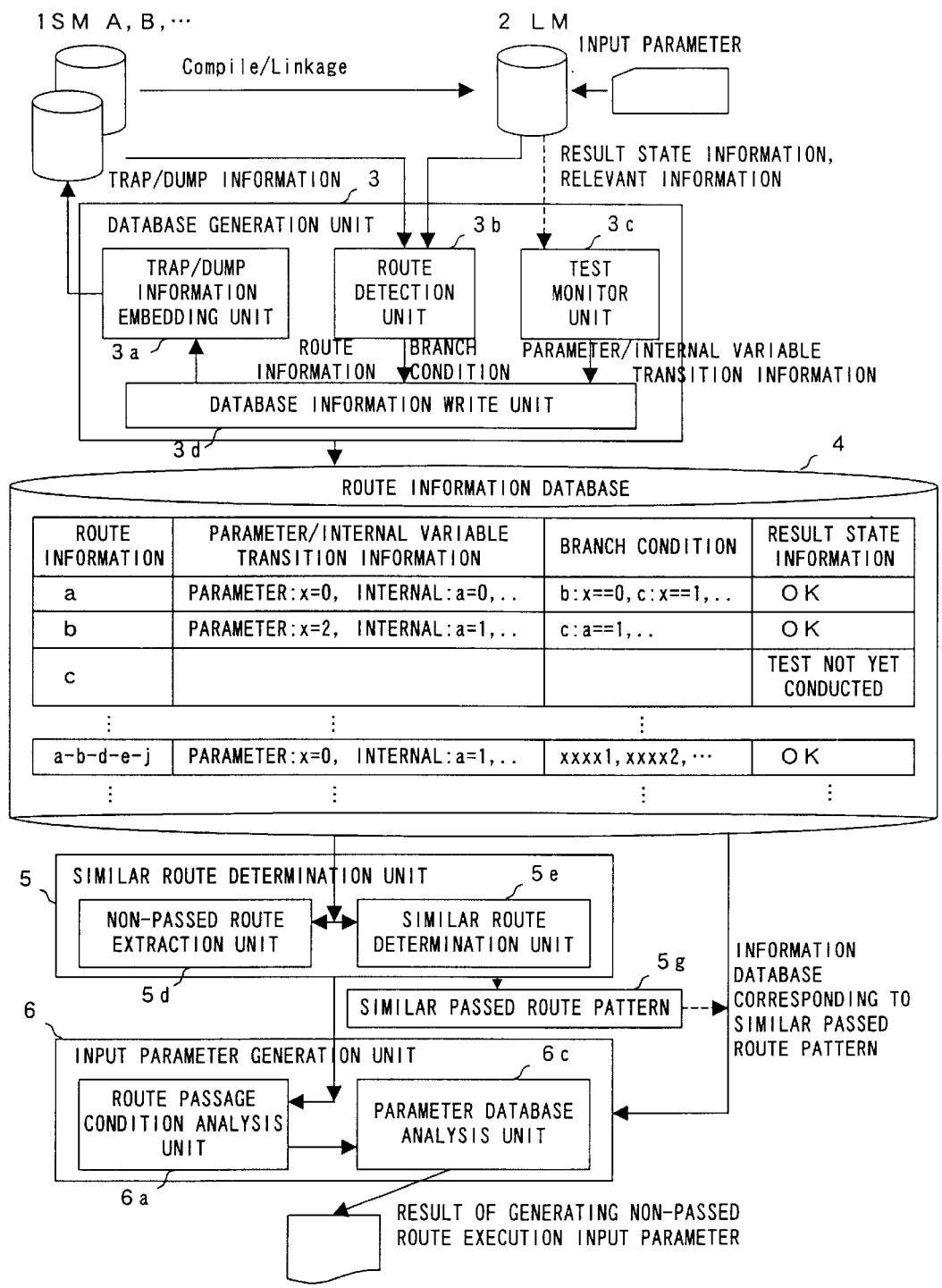
FIG. 3 shows the third principle of the present invention.

FIG. 3 shows the third principle of the input parameter generation apparatus according to the present invention.

In FIG. 3, a component also shown in FIG. 2 is assigned the same reference code.

In the input parameter generation apparatus shown in FIG. 2, the route detection unit 3b of the database generation unit 3 detects all route paths from the source module 1, and enters them in the route information database 4 with branch condition information. The trap/dump information embedding unit 3a embeds trap/dump information in each route path and branch condition to dynamically obtain the extracted route path information and the transition information about a parameter and an internal variable. The test monitor unit 3c monitors a dynamic execution state of the load module 2 generated from the source module 1 into which the trap/dump information is embedded by the trap/dump information embedding unit 3a, and extracts the transition of each route path passage result state information and a parameter value which changes at the execution time of each route path, and the transition relating to an internal variable in a program affecting the parameter value. In addition, the database information write unit 3d collects and enters these pieces of information in the route information database 4.

The similar route determination unit 5 comprises the non-passed route extraction unit 5d for extracting a non-passed route path from the route information database 4 generated as described above, and the similar route determination unit 5e for extracting a passed route pattern which contains a passed route path immediately before the non-passed route path, and is a similar route pattern having less branch conditions. The similar route determination unit 5e extracts a similar passed route pattern 5g having the optimum condition.

The input parameter generation unit 6 comprises the route passage condition analysis unit 6a for extracting a branch condition of a route path immediately before the non-passed route path from the route information database 4 with reference to the non-passed route pattern having the optimum condition and extracted by the similar route determination unit 5, and analyzing the condition for passage through the non-passed route path; and an input parameter database analysis unit 6c for extracting the transition of a parameter for use in satisfying the condition and an internal variable affecting the parameter value from the route information database 4, and analyzing the result. The input parameter generation unit 6 has the function of quickly generating an input parameter required to pass a non-passed route path without directly analyzing a source code.

According to the present invention, as described by referring to the principles shown in FIGS. 1 through 3, a non-passed route pattern is extracted, and simultaneously an input parameter for use in determining a branch condition value to a non-passed route is automatically obtained. Then, by using the input parameter, an optional unexecuted route test can be easily conducted, thereby efficiently performing a high-quality test covering all route paths.

FIG. 4 shows the first embodiment of the present invention.

In FIG. 4, a component also shown in FIG. 2 is assigned the same reference code.

The route detection unit 3b of the database generation unit 3 refers to the source module 1, extracts a route in the process flow contained in the source module 1, and enters route information in the route information database 4 through the database information write unit 3d. In addition, the trap/dump information embedding unit 3a embeds the trap/dump information in the source module 1 through a debugger function according to the route information extracted by the route detection unit 3b. Then, it compiles and links the source module 1, and generates the load module 2. Then, the trap/dump information embedding unit 3a inputs an input parameter in the load module 2 for execution, and the route detection unit 3b obtains the information relating to a passed route. At this time, the test monitor unit 3c controls the execution of the load module 2, obtains an input parameter, also obtains information (result state information) about the execution result and the relevant information, and enters these pieces of information in the route information database 4 through the database information write unit 3d.

The route information and the information based on the test result of the load module 2 are entered in the route information database 4. The similar route determination unit 5 refers to the route information database 4, and extracts a non-passed route by the non-passed route extraction unit 5d. Furthermore, according to the non-passed route information, the similar route determination unit 5e determines a route similar to the non-passed route from among passed routes. The determined similar route is input to the input parameter generation unit 6 as the route pattern information to be processed in generating an input parameter. The route passage condition analysis unit 6a of the input parameter generation unit 6 refers to the source program (source module) 1, and analyzes a passage condition in a branch unit of a non-passed route. The parameter generation unit 6b generates an input parameter which passes a non-passed route according to the analysis result, and outputs it as a non-passed route execution input parameter generation result.

FIGS. 5A and 5B show a practical example of the source code (program) 1 used in describing the present embodiment.

As shown in FIG. 5A, the source code 1 comprises two functions func1 and func2. The func2 is a function having no return value (void type) to be called by the func1. FIG. 5B shows an example of the passed/non-passed state of a route path obtained from each source code when a test is actually conducted by the route detection unit 3b and the test monitor unit 3c. In FIG. 5A, codes a1, b2, . . . , j1 are assigned for each of the minimum functions to specify a route path by a combination of these codes. In FIG. 5B, a passed route path is indicated by a bold line. In addition, a1, b1, . . . , j1 indicate route paths a1, b1, . . . , j1 in the source code of the function func1 shown in FIG. 5A. These codes can be appropriately assigned in any of the conventional methods. When an execution test is conducted, an input parameter obtained as relevant information by the test monitor unit 3c when each route pattern is passed is detected at each execution time, and stored in the route information database 4 by the database information write unit 3d.

Figure 6:
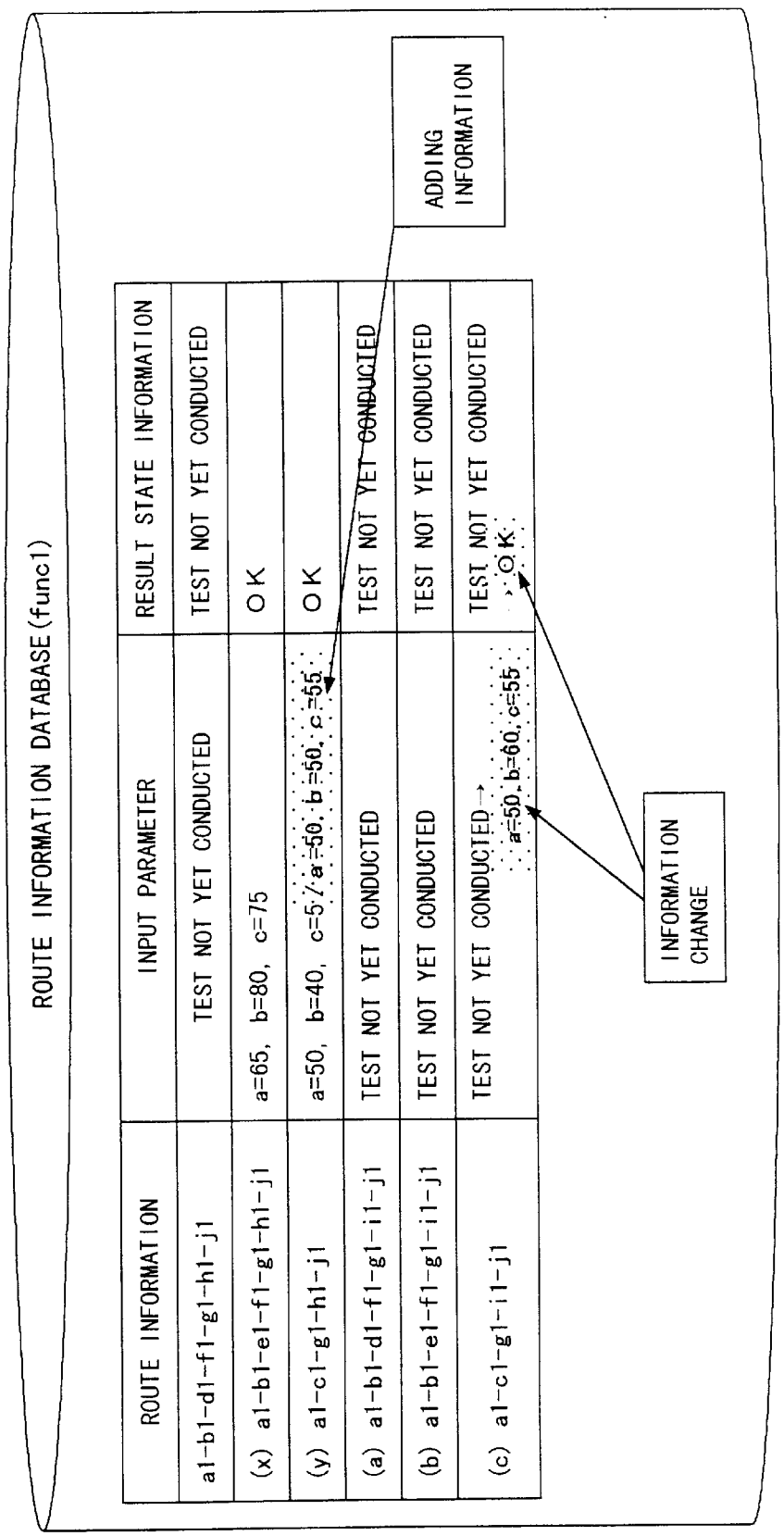
FIG. 6 shows a practical example of a route information database 4.

FIG. 6 shows an example of the route information database 4. In this example, the route information database 4 stores all route information and all input parameter values when the routes are passed through. FIG. 6 shows the state obtained after a route pattern (x) is once passed through, and a route pattern (y) is once passed through. The data shown in a net pattern indicates an input parameter value in a route newly passed when the load module 2 is executed after using similar route information and determining a new input parameter as described below.

The non-passed route extraction unit 5d of the similar route determination unit 5 refers to the route information database 4, and obtains a logical sum of extracted data to obtain a passed route path from a tested route.

Based on the extraction result, the non-passed route paths of a source code of the functions func1 and func2 can be obtained as follows.

func1 : d1, i1 func2 no non-passed route paths (execution completed)

The similar route determination unit 5e of the similar route determination unit 5 extracts based on the above described extraction result a route pattern in which the non-passed route paths d1 and i1 are passed through. In this example, the extraction pattern of the route path i1 is described. According to the route pattern in which the non-passed route path i1 is passed through, three patterns can be obtained by searching the route information database 4, that is, (a) a1-b1-d1-f1-g1-i1-j1, (b) a1-b1-e1-f1-g1-i1-j1, and (c) a1-c1-g1-i1-j1. To select one route pattern on condition that the number of route branches is the smallest possible value, (c) a1-c1-g1-i1-j1 can be obtained as a pattern having the smallest number of branches because (a) has 7 routes, (b) has 7 routes, and (c) has 5 routes. As a result, it is defined as the information 5f about a route pattern to be processed.

Next, route paths are sequentially retrieved from the route pattern (c) a1-c1-g1-i1-j1, the retrieved data is compared with the contents of the previous test result, and the closest tested route pattern is obtained. The route passage condition analysis unit 6a extracts the route information (x) and (y) shown in FIG. 6 as a tested route pattern in which the leading route path a1 in the above described route pattern (c) to be processed is passed through. Furthermore, it detects the route information (y) as a tested route pattern in which the second route path c1 in the above described route pattern (c) to be processed is passed through. Based on the above described results, a similar pattern to the route pattern (c) to be processed is set to (y).

Next, an input parameter required to pass the route pattern to be processed is obtained from a similar pattern (y).

First, based on the parameter values a=50, b =40, c=55 when the similar pattern (y) is passed through, the value of b is increased by +10, thereby setting the parameter values to a=50, b=40, and c=55. Thus, the function func1 is executed with the similar pattern (y) passed without passing the route pattern (c) to be processed. At this time, the parameter value is additionally entered as an input parameter of the similar pattern (y). Next, the value of b is furthermore increased by +10, thereby setting the parameter values to a=50, b=60, and c=55. Thus, the function func1 is executed again with the route pattern (c) to be processed passed through. At this time, the parameter value is additionally entered as an input parameter of the route pattern (c).

Thus, an input parameter value for use in using an unexecuted route of the function func1 can be obtained by repeating the execution of the function func1 with the input parameter value changed as described above.

According to the present embodiment, a parameter value is sequentially increased by 10. However, the increment or decrement of a parameter value can be arbitrarily set. In addition, when a parameter value is increased or decreased, and if the parameter has been already tested, then the value is skipped in thereafter conducting the test.

Figure 8A:
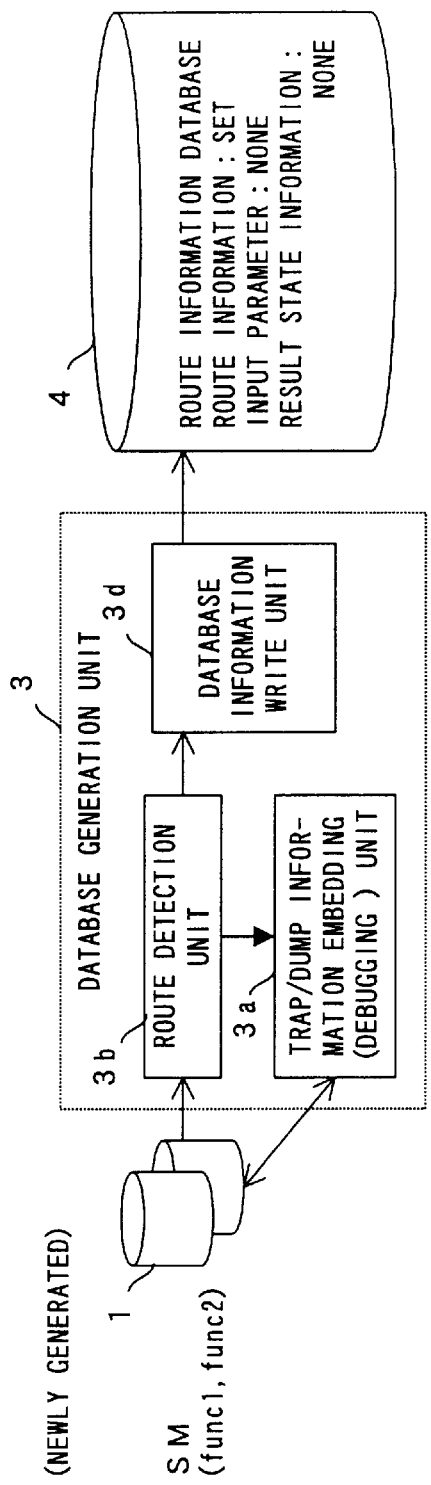
FIG. 8 shows the operation of a database generation unit 3.
Figure 8B:
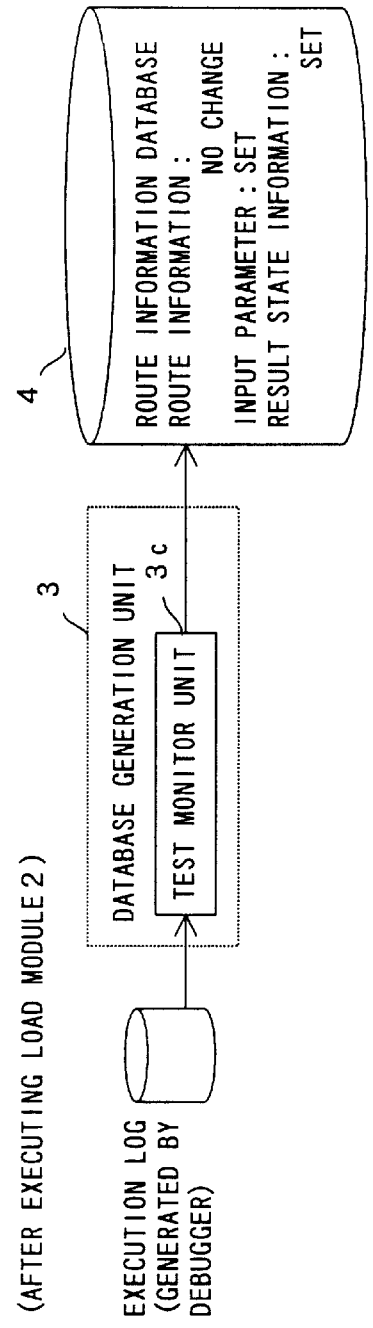

FIGS. 8A and 8B show the operations of the database generation unit 3.

In FIGS. 8A and 8B, components also shown in FIG. 4 are assigned the same reference codes.

FIG. 8A shows the operation performed when route information is newly entered in the route information database 4. The route detection unit 3b of the database generation unit 3 refers to the source program 1, divides the source program 1 for each of the minimum functions, and assigns a code to each of the minimum functions. Then, the route in which the process of the source program 1 flows is searched, and a detected route is represented as route information as a combination of the codes assigned to the minimum functions. Thus represented route information is written to the route information database 4 through the database information write unit 3d. In addition, the route information obtained by the route detection unit 3b is also transmitted to the trap/dump information embedding unit 3a, and the debugger function of the trap/dump information embedding unit 3a is activated. Then, the trap/dump information embedding unit 3a embeds the trap/dump information into the source program.

FIG. 8B shows the operation performed when route information is completely entered in the route information database, and a passed/non-passed route is set by executing the load module 2.

When the load module 2 is executed, an execution log is generated by a debugger. The test monitor unit 3c of the database generation unit 3 refers to an execution log, obtains the information indicating which route has been passed through, and a parameter value when the route is passed through, and writes the input parameter and the execution result state information to the route information database.

In the above described operations, for example, the route information database 4 as shown in FIG. 6 can be configured.

FIG. 9 shows the operation of the similar route determination unit 5.

The non-passed route extraction unit 5d of the similar route determination unit 5 refers to the route information database 4, and extracts a non-passed route in the above described method. In the example according to the first embodiment, the route paths i1 and d1 are extracted as non-passed route paths. In the above described embodiment, the route path i1 is adopted as a non-passed route path to be processed.

However, when a similar route is actually determined by the similar route determination unit 5e, both route paths i1 and d1 are processed. In this example, only the route path i1 is processed as a non-passed route path to be processed as in the above described embodiment for simple explanation.

When the route path i1 is input as a non-passed route path from the non-passed route extraction unit 5d, the similar route determination unit 5e extracts a route pattern in which the non-passed route path i1 is passed while referring to the route information database 4 in step S1. In the above described embodiment, the three patterns (a), (b), and (c) are extracted. When a similar route is determined by adopting a route pattern having the smallest number a of branches as described above, the number of branches are determined in step S2. If the number of branches is 1, there is not a smaller number of branches. As a result, the route pattern having 1 as the number of branches is determined to be a similar route, and is output as the information 5f about a route pattern to be processed. If it is determined in step S2 that the number of branches is larger than 1, then a route pattern having the smallest number of branches is selected in step S3, and is defined as the information 5f about a route pattern to be processed. In the above described embodiment, the route pattern (c) is selected.

FIG. 10 shows the operation of the input parameter generation unit 6.

The route passage condition analysis unit 6a of the input parameter generation unit 6 refers to the route information database 4 and the information 5f about a route pattern to be processed, and extracts in step S5 the route information whose result state information of the route information database 4 is 'OK' (indicating a passed route), and whose leading route path matches the leading route path (a1 in the above described embodiment) of the information about a route pattern to be processed (In the above described embodiment, (x) and (y) are extracted).

Next, the route passage condition analysis unit 6a extracts in step S6 the route information whose result state information of the route information database 4 is 'OK', and whose second route path matches the second route path (c1 in the above described embodiment) of the information about a route pattern to be processed (In the above described embodiment, (y) is extracted).

Then the parameter generation unit 6b analyzes the input information for use in processing the route pattern ((y) in the above described embodiment) extracted by the route passage condition analysis unit 6a, selects a similar parameter (step S7), and executes the load module 2 (step S8). Then, it determines based on the execution result whether or not the route path i1 has been passed in step S9. If not, the input parameter information is stored in the route information database 4 in step S10, the parameter generation unit 6b is activated, and another input parameter is set in step S7. Then, in step S8, a load module is executed again, and it is determined in step S9 whether or not the route path i1 has been passed through. Thus, the processes from step S7 to S10 are repeated until an input parameter passing the route path i1 can be obtained. Then, in step S9, when an input parameter passing the route path i1 is obtained (in the above described embodiment, the route path i1 is passed under the condition of a=50, b=60, and c=55), and the input parameter information and the result state information are stored in the route information database 4, thereby terminating the process.

FIG. 11 shows the second embodiment of the present invention.

In FIG. 11, a component also shown in FIG. 4 is assigned the same reference code.

The route detection unit 3b of the database generation unit 3 detects a route from the source code (source module) 1, and generates route information 3e and branch condition 3f. The route information 3e and the branch condition 3f are entered in the route information database 4 through the database information write unit 3d. In addition, the trap/dump information embedding unit 3a embeds the trap/dump information in the source code 1 so that necessary parameter information can be obtained at the execution time of the load module 2 after compiling and linking the source module 1. When the load module 2 is generated by the compiling and linking process, an input parameter is input and the load module 2 is executed. The executed route information obtained as a result of executing the load module 2 is obtained by the route detection unit 3b, and entered in the route information database 4 through the database information write unit 3d. In addition, the parameter transition information obtained by the test monitor unit 3c and internal variable transition information 3g are also entered in the route information database 4 through the database information write unit 3d.

Then, the similar route determination unit 5 refers to the data entered in the route information database 4, and instructs the non-passed route extraction unit 5d to extract a non-passed route path. Based on the extracted non-passed route path, the similar route determination unit 5e determines a similar route, and outputs it as the passed similar route pattern information 5f. The passed similar route pattern 5f is stored in a route information database 4a (which can be the route information database 4). The route passage condition analysis unit 6a of the input parameter generation unit 6 refers to the route information database 4a, and analyzes a branch condition of a function for branching to a non-passed route path based on the passed similar route pattern 5f. The input parameter database analysis unit 6c refers to the information of the route information database 4a and the analysis result of the route passage condition analysis unit 6a to generate and output an input parameter which passes a non-passed route path.

Figures 12A, 12B:
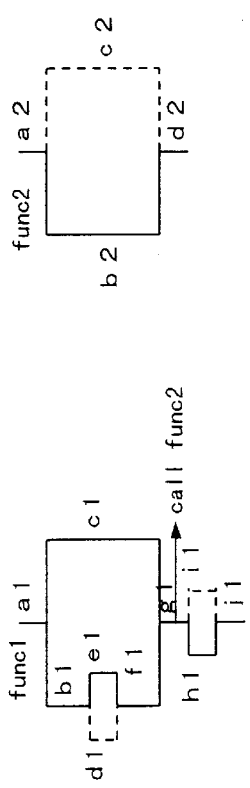
FIG. 12 shows a practical example of a source code used in the description of the present embodiment.

FIGS. 12A and 12B show practical examples of the source code (source program) 1 used in the description of the present embodiment.

As shown in FIG. 12A, the source code 1 comprises two functions func1 and func2. The func2 is called by the func1. From each source code, the following route paths are detected when a load module is generated according to the trap information embedded by the trap/dump information embedding unit 3a.

func1: a1, b1, c1, d1, e1, f1, g1, h1, i1
func2: a2, b2, c2, d2

FIG. 12B shows the route information 3e as an image showing the passed/non-passed state of a route path obtained when an actual test is conducted on the functions func1 and func2 through the route detection unit 3b and the test monitor unit 3c. According to the route information, a non-passed route path is detected by the non-passed route extraction unit 5d. In the present embodiment, the following non-passed route paths are detected.

func1: d1, i1
   func2: c2

In addition, the similar route determination unit detects the similar passed route pattern 5f in which a route path immediately before a non-passed route path is passed through, and which has the optimum condition having a small number of branches. In the present embodiment, the route pattern having the optimum condition can be described as follows.

func1: a1-b1-e1-f1-g1-h1-j1
func2: a1-b2-d2

On the other hand, the branch condition 3f to the next route path obtained from the compiler when the load module 2 is generated, the route information 3e which is the route path obtained when the load module 2 is executed, and the parameter transition information/internal variable transition information 3g are entered in the route information database 4 by the database information write unit 3d. FIG. 13 shows a practical example of the route information database 4a obtained by extracting from the above described entered information only the information relating to the similar passed route pattern having the optimum condition selected by the similar route determination unit 5e.

The contents of the information entered in the route information database 4a are listed as follows.

rout path name
   transition from parameter 1 to n (n indicates the number of parameters contained in the source code 1)
   transition of an internal variable involved in the change of parameter
   link-to route of a call function next route path branch condition
   return value The route passage condition analysis unit 6a extracts the next path branch condition of the route path immediately before the non-passed route paths i1 and d1 from the information in the route information database 4a shown in FIG. 13, and analyzes the conditions required for passage through a non-passed route path. Furthermore, the input parameter database analysis unit 6c analyzes the transition of parameters and the transition of internal functions in the route information database 4a shown in FIG. 13. Thus, an input parameter for passage through non-passed route pattern can be obtained. An example of the process of obtaining an input parameter for passage through non-passed route pattern, and a result of the process is described below.

1) A condition for branching from the route path g1 immediately before the route path i1 to the route path i1 is extracted (a ≧100).
2) The transition of an internal variable a is confirmed from the route path execution result of the route path g1 (a=x+func2 (tb1)). The tb1 indicates the name of the structure of the input parameter 2.
3) The return value of another function func2 (tb1) involved in the transition of 2) is obtained (func2 (tb1)=2).
4) The transition of a is confirmed in all route paths in and before the route path g1 (no transition).
5) From 1) through 4) above, it is determined that the internal variable (a)=x+2, the internal variable (a)≧100, and the internal variable is affected by the input parameter 1 (x). Therefore, it is necessary that input parameter 1 (x)≧98 at the branch point between the route paths hi and i1.
6) A condition for branching from the route path b1 immediately before the route path d1 to the route path d1 is extracted (x>10).

7) The transition of x is confirmed from the route path execution result of the route path b1 (no transition).
8) The transition of x is confirmed in all route paths in and before the route path b1 (for a1, x=x +tb1–>t1).
9) It is determined that tb1–>t1 refers to 2 if it is assumed that the input parameter 2 is the initial value (since the input parameter 2 (tb1) is a parameter of the func2, the result of 5) is different if the value is changed. Accordingly, the initial value of the input parameter 2 (tb1) is used as is).
10) From 8) and 9), x =x +2 for a1.
11) From 6) through 10), the input parameter 1 (x) is x>8 when it is input.
12) Based on the condition of the input parameter 1 (x) and that the portion affecting the x before the branch portion of the route paths h1 and i1 is only a1 according to 6) through 10) above, the input parameter 1 (x) is x≧96 when it is input.
13) From 11) and 12) above, since x>8 and x>96, it is determined that x≧96 is the condition of the input parameter 1.

Figure 14A:
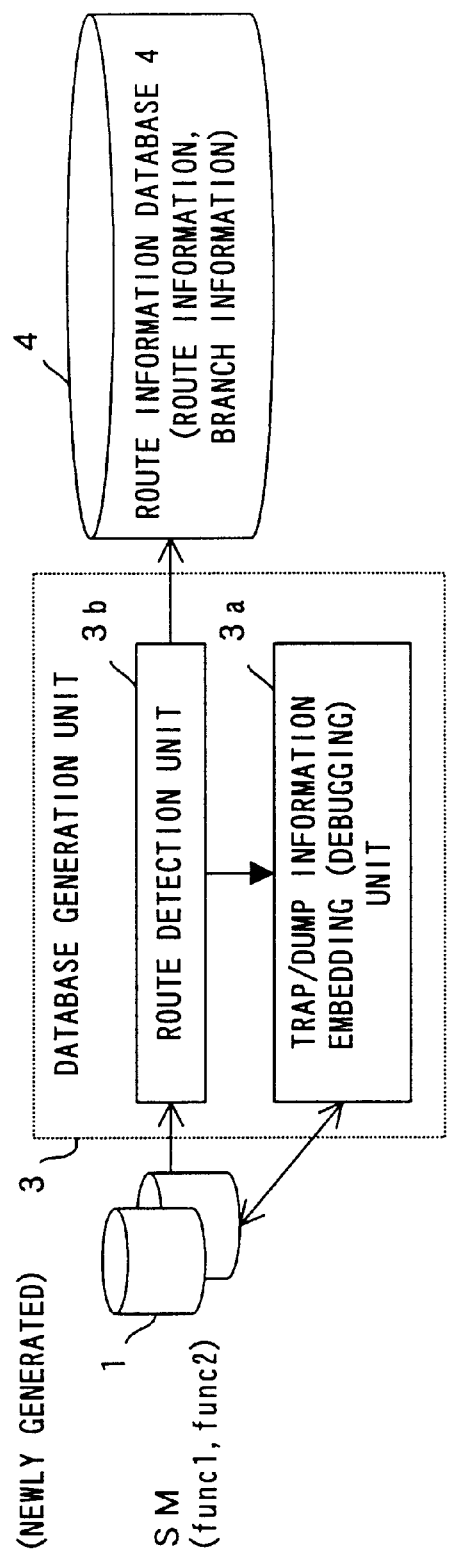
FIG. 14 shows the operation of a database generation unit 3.
Figure 14B:
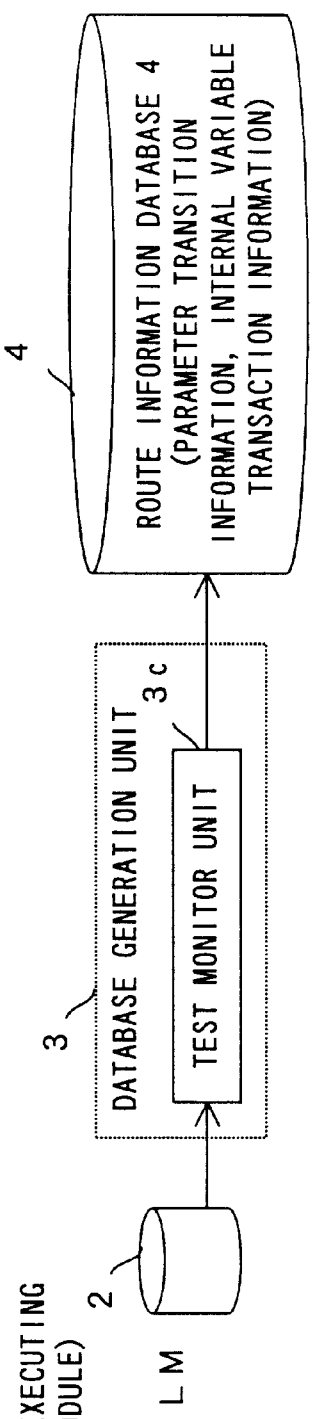

Accordingly, an input parameter is generated by selecting an appropriate value from among the values satisfying the following conditions.

input parameter 1 (x) x≧96
input parameter 2 (tb1) tb1–>t1=2, tb1–>t2=1
input parameter 3 (str) optional FIGS. 14A and 14B show the operations of the database generation unit 3.

In FIGS. 14A and 14B, components also shown in FIG. 11 are assigned the same reference codes.

As shown in FIG. 14A, when information is newly entered in the route information database 4, the route detection unit 3b of the database generation unit 3 refers to the source program (source module: SM) 1, and generates route information and branch information. At this time, a code for each of the minimum functions is added by the route detection unit 3b. In addition, the trap/dump information embedding unit 3a embeds trap/dump information in the source program 1 after compiling and linking the source program 1 to generate the load module 2 so that a parameter value during the execution can be extracted when the load module is executed.

When the above described process is completed, the source program 1 is compiled and linked as shown in FIG. 14B, and the load module 2 is generated. Then, the test monitor unit 3c of the database generation unit 3 executes the load module 2, obtains the transition information about a parameter and the transition information about an internal variable, and enters them in the route information database 4.

Figure 15:
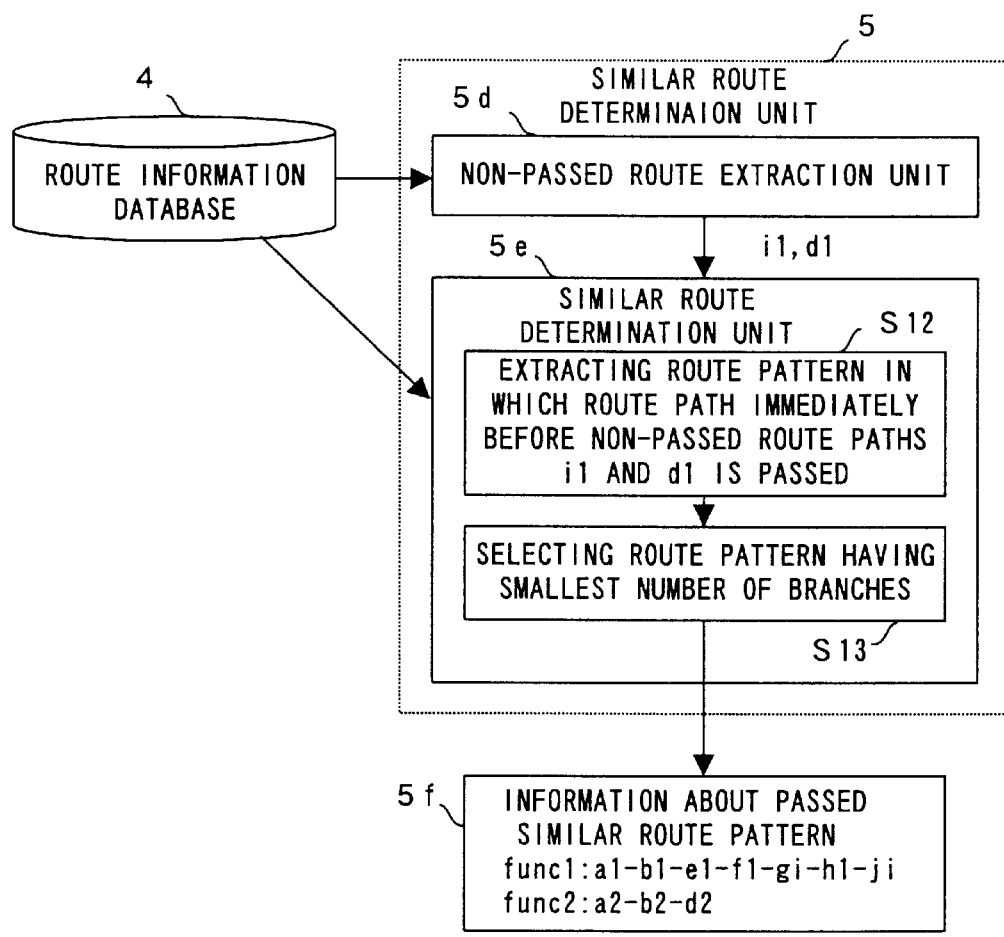
FIG. 15 shows the operation of a similar route determination unit 5.

FIG. 15 shows the operation of the similar route determination unit 5.

In FIG. 15, a component also shown in FIG. 11 is assigned the same reference code.

The non-passed route extraction unit 5d of the similar route determination unit 5 extracts non-passed route path during the execution of the load module 2 according to the information of the route information database 4 generated by the database generation unit 3. In the above described embodiment, the route paths i1 and d1 are non-passed. The information about the non-passed route paths is input to the similar route determination unit 5e.

In step S12, the similar route determination unit 5e extracts from the route information database 4 the route pattern in which a route path immediately before the non-passed route paths i1 and d1 is passed through. Then, in step S13, a route pattern for use in generating an input parameter is selected from the extracted route patterns. In this example, a route pattern having the smallest number of branches is selected. Thus, the selected route pattern is output as the passed similar route pattern information 5f. In the above described embodiment, a similar route pattern is selected for each of the func1 and func2.

Figure 16:
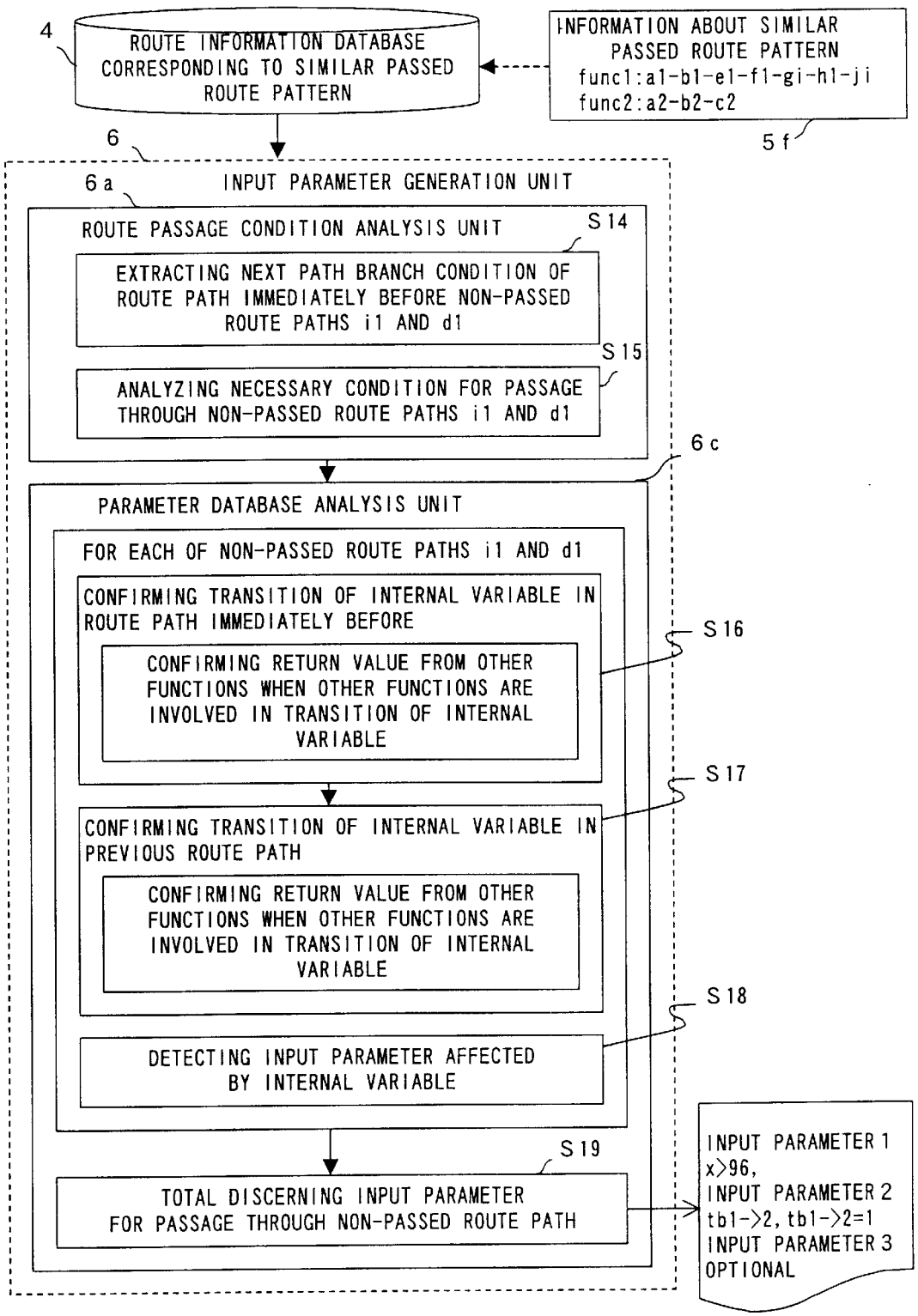
FIG. 16 shows the operation of an input parameter generation unit 6.

FIG. 16 shows the operation of the input parameter generation unit 6.

In FIG. 16, a component also shown in FIG. 11 is assigned the same code number.

The passed similar route pattern information 5f generated by the similar route determination unit 5 is input to the route information database 4. The route passage condition analysis unit 6a of the input parameter generation unit 6 reads the passed similar route pattern information 5f from the route information database 4, and extracts the path branch condition for the route path immediately before the non-passed route paths i1 and d1 in step S14. In step S15, it analyzes a necessary condition for passage through the non-passed route paths i1 and d1. As described above, the analysis requires to perform arithmetic operations such as an inequality, etc., but how to recognize such an inequality and determine a condition depends on the discretion of a user of ordinary skill in the art. The software for processing mathematical expressions are well known, and any processing tools of the software can be used as necessary.

The analysis result obtained in step S15 is input to the input parameter database analysis unit 6c. The input parameter database analysis unit 6c performs the processes in steps S16 through S18 for each of the non-passed route paths i1 and d1. In step S16, the transition of an internal variable in the route path immediately before the non-passed route paths i1 and d1 is confirmed. That is, when the transition of an internal variable involves another function, a process of, for example, confirming a return value from the other function is performed. Then, in step S17, the transition of an internal variable in the route path before the one immediately before the non-passed route paths i1 and d1 is confirmed. That is, when the transition of an internal variable involves another function, a process of, for example, confirming a return value from the other function is performed. Then, in step S18, the input parameter affected by an internal variable is detected.

When the processes in steps S16 through S18 are completed for each of the non-passed route paths i1 and d1, an input parameter for passage through a non-passed route path is totally discrened in step S19, and output a result. Otherwise, an input parameter satisfying an obtained condition can be designed to be automatically generated and output. In this process, inequalities and related logical operations are required, for which a method used in existing mathematical expression processing software can be adopted, or a user of ordinary skill in the present technology can uniquely develop a processing program. Anyway, it depends on the discretion of the user.

Figure 17:
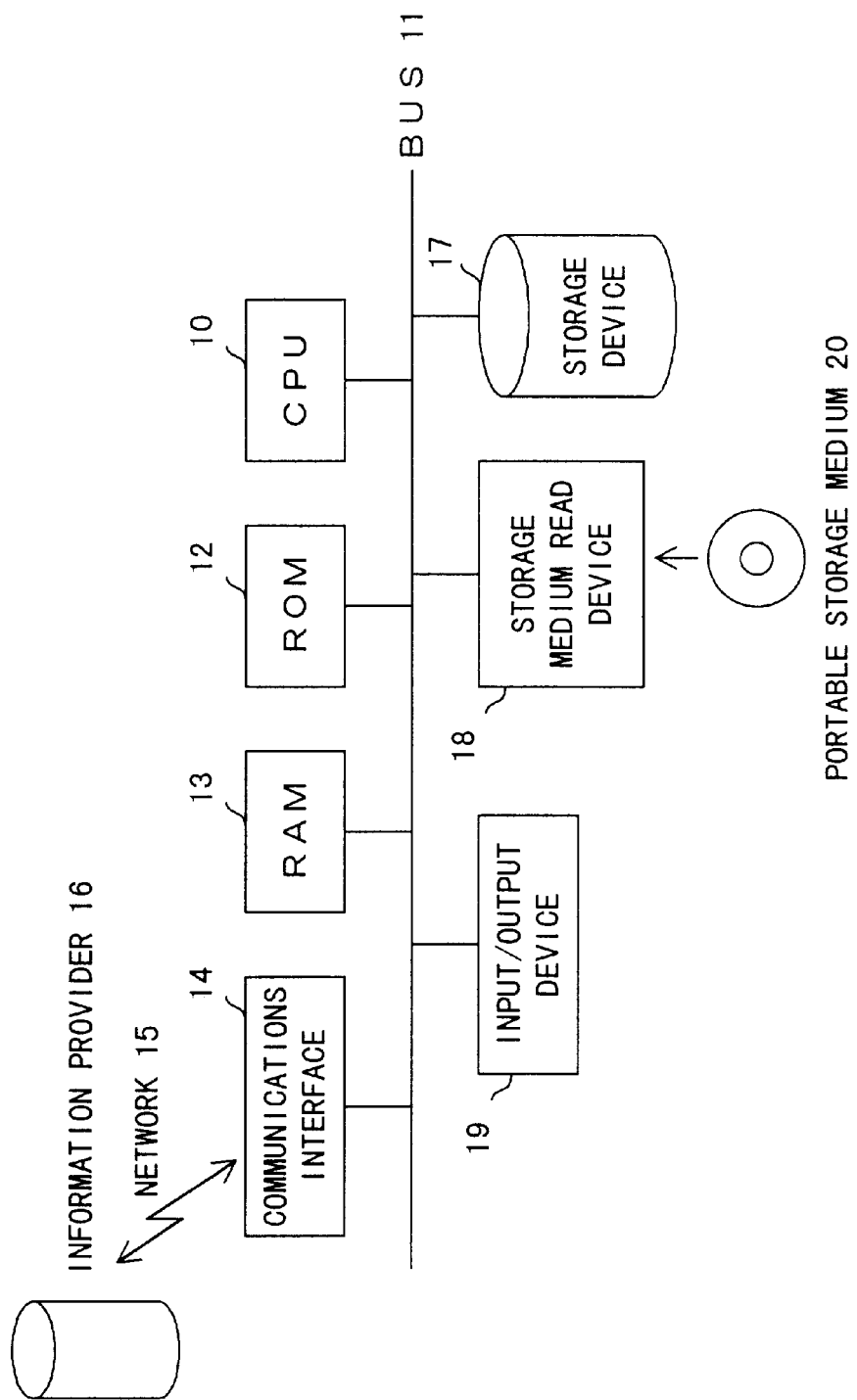
FIG. 17 shows the hardware environment required when an embodiment of the present invention is realized using a program.

FIG. 17 shows the hardware environment required when an embodiment of the present invention is realized by a program.

The hardware configuration of the case in which the above described embodiment of the present invention is realized by executing a program in a computer requires a CPU 10, and various devices connected through a bus 11. A device connected to the CPU 10 through the bus 11 can be ROM 12, RAM 13, a storage device 17, a storage medium read device 18, an input/output device 19, a communications interface 14, etc.

The ROM 12 stores BIOS, etc. for control of the basic operations of a computer. When a computer is used exclusively for realization of an embodiment of the present invention, the ROM 12 can store a program for realizing an embodiment. Generally, a program for realizing is stored in the storage device 17 and a portable storage medium 20. The storage device 17 can be a hard disk, etc., and the portable storage medium 20 can be a floppy disk, an MO, etc. A program stored in the storage device 17 and the portable storage medium 20 is loaded onto the RAM 13 through the bus 11, or through the bus 11 and the storage medium read device 18 for execution by the CPU 10. An input from a user to a computer, or an output from a computer to a user is made through an input/output device 19. The input/output device 19 can be a mouse, a keyboard, a display, etc.

The route information database 4 according to the embodiment can be generated in the storage device 17 and the portable storage medium 20. A program for realizing an embodiment can also be executed in a network environment in which the communications interface 14 is used. That is, an information provider 16 has a program for realizing an embodiment, and downloads it on the storage device 17 and the portable storage medium 20 through a network 15 for execution of the program. Otherwise, the information provider 16 executes the program, and a local user stores the source module 1 and the load module 2 in the storage device 17 and the portable storage medium 20 to realize an embodiment of the present invention by transmitting and receiving necessary information through the network 15. Otherwise, the information provider 16 can hold both source module 1 and load module 2. Furthermore, the route information database 4 can also be generated on the information provider 16 side.

In addition, the network 15 shown in FIG. 17 can be a LAN, a WAN, Intranet, Internet, etc.

As described above, when a program is tested according to the present invention, an input parameter for the program for performing a passage test on non-passed (untested) route can be quickly found, thereby successfully reducing the operation of conducting a passage test on a program.

What is claimed is:

1. An input parameter generation apparatus used in converting a source module having a plurality of functions into a load module for execution, comprising:
   an extraction unit extracting a route pattern containing a set of route paths through which a process for each of the plurality of functions of the source module passes, relevant information indicating a progress state of a process of each route pattern when the load module is executed using a specific input parameter, and result state information indicating whether or not each route pattern has been passed in an execution time of the load module;
   a similar route determination unit extracting a route path not passed when the load module is executed from the information extracted by said extraction unit, and extracting a route pattern similar to a route pattern containing the route path not passed in the route pattern passed while the load module is executed, and relevant information about the similar route pattern; and
   an input parameter generation unit analyzing the source module based on the similar route pattern and the relevant information about the similar route pattern, and generating a value of an input parameter for passage through a non-passed route path.

2. The apparatus according to claim 1, further comprising a database unit storing information extracted by said extraction unit corresponding to each piece of the information.

3. The apparatus according to claim 1, wherein said extraction unit comprises:
   a route detector detecting a route pattern as a set of route paths detected in units of minimum functions of the source module;
   a trap/dump information embedder embedding trap/dump information in the source module; and
   a monitor obtaining an input parameter when the load module is executed, and a value of the input parameter in a passed route path as the relevant information according to the trap/dump information when the route path is passed.

4. The apparatus according to claim 1, wherein said similar route determination unit comprises:
   non-passed route extractor extracting a non-passed route path from the information extracted by said extraction unit; and
   a similar route determiner specifying a route pattern having a smallest number of branches from among route patterns, which is passed while the load module is executed, similar to a route pattern containing the route path not passed.

5. The apparatus according to claim 1, wherein said input parameter generation unit comprises:
   a route passage condition analyzer analyzing a value of an input parameter capable of passing the non-passed route path based on the similar route pattern, and the relevant information about the similar route pattern; and
   a parameter generator generating a value of an input parameter for passage through the non-passed route path based on an analysis result of said route passage condition analyzer.

6. The apparatus according to claim 5, wherein said parameter generator generates a value of an input parameter for passage of a process through the non-passed route path by keeping executing the load module while changing a value of an input parameter based on a predetermined rule.

7. The apparatus according to claim 2, wherein said extraction unit comprises:
   a route detector detecting a route pattern as a set of route paths detected in units of minimum functions of the source module;
   a trap/dump information embedder embedding trap/dump information in the source module; and
   a monitor obtaining transition information about the input parameter, transition information about an internal variable relating to the input parameter, relational information between the input parameter and the internal variable, and branch condition information at a branch position based on the input parameter and the trap/dump information during the execution of the load module, and storing the obtained information in said database unit.

8. The apparatus according to claim 7, wherein said similar route determination unit comprises:
   non-passed path extractor extracting a non-passed route path from a route pattern detected by said route detector; and
   a similar route determiner extracting as a similar pattern a route pattern in which a route path immediately before the non-passed route path has been passed and which has a small number of branches in route patterns through which a process passed while the load module were being executed.

9. The apparatus according to claim 8, wherein said input parameter generation unit comprises:
   a route passage condition analyzer analyzing a condition for passing a non-passed route path according to branch condition information of a route path immediately before the non-passed route path relating to the similar route pattern; and
   an input parameter database analyzer analyzing and determining a transition of an input parameter and an internal variable for use in satisfying the condition according to the transition information about an input parameter, and the transition information about the internal variable relating to an input parameter stored in said database unit.

10. An input parameter generation method used in converting a source module having a plurality of functions into a load module for execution, comprising the steps of:
   (a) extracting a route pattern containing a set of route paths through which a process for each of the plurality of functions of the source module passes, relevant information indicating a progress state of a process of each route pattern when the load module is executed using a specific input parameter, and result state information indicating whether or not each route pattern has been passed in an execution time of the load module;
   (b) extracting a route path not passed when the load module is executed from the information extracted by said extraction unit, and extracting a route pattern similar to a route pattern containing the route path not passed in the route pattern passed while the load module is executed, and relevant information about the similar route pattern; and
   (c) analyzing the source module based on the similar route pattern and the relevant information about the similar route pattern, and generating a value of an input parameter for passage through a non-passed route path.

11. The method according to claim 1, further comprising the step of:
   storing information extracted in said step (a) corresponding to each piece of the information.

12. The method according to claim 10, wherein said step (a) comprising the steps of:
   detecting a route pattern as a set of route paths detected in units of minimum functions of the source module;
   embedding trap/dump information in the source module; and
   obtaining an input parameter when the load module is executed, and a value of the input parameter in a passed route path as the relevant information according to the trap/dump information when the route path is passed.

13. The method according to claim 10, wherein said step (b) comprises the steps of:
   extracting a non-passed route path from the information extracted in said step (a); and
   specifying a route pattern having a smallest number of branches from among route patterns, which is passed while the load module is executed, similar to a route pattern containing the route path not passed.

14. The method according to claim 10, wherein said step (c) comprises the steps of:
   analyzing a value of an input parameter capable of passing the non-passed route path based on the similar route pattern, and the relevant information about the similar route pattern; and
   generating a value of an input parameter for passage through the non-passed route path based on an analysis result of said analyzing step.

15. The method according to claim 14, wherein said step (c) generates a value of an input parameter for passage of a process through the non-passed route path by keeping executing the load module while changing a value of an input parameter based on a predetermined rule.

16. The method according to claim 11, wherein said step (a) comprises the steps of:
   detecting a route pattern as a set of route paths detected in units of minimum functions of the source module;
   embedding trap/dump information in the source module; and
   obtaining transition information about the input parameter, transition information about an internal variable relating to the input parameter, relational information between the input parameter and the internal variable, and branch condition information at a branch position based on the input parameter and the trap/dump information during the execution of the load module, and storing the obtained information in said database unit.

17. The method according to claim 16, wherein said step (b) comprises the steps of:
   extracting a non-passed route path from a route pattern detected by said step (a); and
   extracting as a similar pattern a route pattern in which a route path immediately before the non-passed route path has been passed and which has a small number of branches in route patterns through which a process passed while the load module were being executed.

18. The method according to claim 17, wherein said step (c) comprises the steps of:
   analyzing a condition for passing a non-passed route path according to branch condition information of a route path immediately before the non-passed route path relating to the similar route pattern; and
   analyzing and determining a transition of an input parameter and an internal variable for use in satisfying the condition according to the transition information about an input parameter, and the transition information about the internal variable relating to an input parameter stored in said storing step.

19. A computer-readable storage medium storing a program for directing a computer to perform a process of generating an input parameter used in converting a source module having a plurality of functions into a load module for execution, the process comprising the steps of:
   (a) extracting a route pattern containing a set of route paths through which a process for each of the plurality of functions of the source module passes, relevant information indicating a progress state of a process of each route pattern when the load module is executed using a specific input parameter, and result state information indicating whether or not each route pattern has been passed in an execution time of the load module;
   (b) extracting a route path not passed when the load module is executed from the information extracted by said extraction unit, and extracting a route pattern similar to a route pattern containing the route path not passed in the route pattern passed while the load module is executed, and relevant information about the similar route pattern; and
   (c) analyzing the source module based on the similar route pattern and the relevant information about the similar route pattern, and generating a value of an input parameter for passage through a non-passed route path.

20. The storage medium according to claim 19, further comprising the step of storing information extracted in said step (a) corresponding to each piece of the information.

21. The storage medium according to claim 19, wherein said step (a) comprising the steps of:

detecting a route pattern as a set of route paths detected in units of minimum functions of the source module;

embedding trap/dump information in the source module; and obtaining an input parameter when the load module is executed, and a value of the input parameter in a passed route path as the relevant information according to the trap/dump information when the route path is passed.

22. The storage medium according to claim 19, wherein said step (b) comprises the steps of:

extracting a non-passed route path from the information extracted in said step (a); and specifying a route pattern having a smallest number of branches from among route patterns, which is passed while the load module is executed, similar to a route pattern containing the route path not passed.

23. The storage medium according to claim 19, wherein said step (c) comprises the steps of:

analyzing a value of an input parameter capable of passing the non-passed route path based on the similar route pattern, and the relevant information about the similar route pattern; and generating a value of an input parameter for passage through the non-passed route path based on an analysis result of said analyzing step.

24. The storage medium according to claim 23, wherein said step (c) generates a value of an input parameter for passage of a process through the non-passed route path by keeping executing the load module while changing a value of an input parameter based on a predetermined rule.

25. The storage medium according to claim 20, wherein said step (a) comprises the steps of:

detecting a route pattern as a set of route paths detected in units of minimum functions of the source module;

embedding trap/dump information in the source module; and obtaining transition information about the input parameter, transition information about an internal variable relating to the input parameter, relational information between the input parameter and the internal variable, and branch condition information at a branch position based on the input parameter and the trap/dump information during the execution of the load module, and storing the obtained information in said database unit.

26. The storage medium according to claim 25, wherein said step (b) comprises the steps of:

extracting a non-passed route path from a route pattern detected by said step (a); and extracting as a similar pattern a route pattern in which a route path immediately before the non-passed route path has been passed and which has a small number of branches in route patterns through which a process passed while the load module were being executed.

27. The storage medium according to claim 26, wherein said step (c) comprises the steps of:

analyzing a condition for passing a non-passed route path according to branch condition information of a route path immediately before the non-passed route path relating to the similar route pattern; and analyzing and determining a transition of an input parameter and an internal variable for use in satisfying the condition according to the transition information about an input parameter, and the transition information about the internal variable relating to an input parameter stored in said storing step.

* * * * *